(12) United States Patent
Wolfe et al.

(10) Patent No.: US 7,340,992 B1
(45) Date of Patent: *Mar. 11, 2008

(54) DUAL BELT CONVEYOR OVEN

(75) Inventors: Gary L. Wolfe, Wichita, KS (US); Ronald D. Wolfe, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 62 days.

This patent is subject to a terminal disclaimer.

(21) Appl. No.: 11/044,840

(22) Filed: Jan. 27, 2005

(51) Int. Cl.
*A47J 37/00* (2006.01)
(52) U.S. Cl. .................... 99/386; 99/443 C; 126/21 A
(58) Field of Classification Search ................. 99/386, 99/468, 444–450, 443 C, 443 R, 476, 477–479; 219/388, 400; 126/214, 21 A; 34/76, 77, 34/463, 464
See application file for complete search history.

(56) References Cited

U.S. PATENT DOCUMENTS

| | | | | |
|---|---|---|---|---|
| 4,389,562 A | * | 6/1983 | Chaudoir | 219/388 |
| 4,457,291 A | * | 7/1984 | Henke | 126/21 A |
| 4,462,383 A | * | 7/1984 | Henke et al. | 126/21 A |
| 4,473,004 A | * | 9/1984 | Wells et al. | 99/386 |
| 4,554,437 A | * | 11/1985 | Wagner et al. | 219/388 |
| 4,610,886 A | * | 9/1986 | Buller-Colthurst | 426/233 |
| D286,368 S | * | 10/1986 | Henke et al. | D7/338 |
| 4,655,126 A | * | 4/1987 | Wells | 99/386 |
| 4,717,572 A | * | 1/1988 | Buller-Colthurst | 426/233 |
| 5,421,316 A | * | 6/1995 | Heber | 126/21 A |
| 5,423,248 A | * | 6/1995 | Smith et al. | 99/443 C |
| 5,606,904 A | * | 3/1997 | Fabbri | 99/326 |
| 5,717,192 A | * | 2/1998 | Dobie et al. | 219/681 |
| 5,832,812 A | * | 11/1998 | Wolfe et al. | 99/443 C |
| 6,049,066 A | * | 4/2000 | Wilson | 219/400 |
| 6,833,533 B1 | * | 12/2004 | Wolfe et al. | 219/388 |

\* cited by examiner

*Primary Examiner*—Timothy F. Simone
(74) *Attorney, Agent, or Firm*—Kenneth H. Jack; Davis & Jack, L.L.C.

(57) ABSTRACT

An air impingement conveyor oven including a baking case having an interior space, a food input port, a food output port, and having a longitudinal axis extending from the food input ports to the food output port; an air heating gas burner connected operatively to the baking case for heating air within the interior space; a plurality of air registers mounted within the baking case's interior space, the air registers being positioned longitudinally along the baking case's longitudinal axis; an air blower mounted within the baking case's interior space; a network of air ducts interconnecting the air registers and the air blower; left and right conveyor belts extending along the baking case's longitudinal axis and being respectively positioned leftwardly and rightwardly from the longitudinal axis; a first roller mounted intersectingly across the baking case's longitudinal axis, the first roller being frictionally engaged with the left and right conveyor belts, the first roller being annularly coffered at said axis; and an electric motor connected operatively to the first roller.

6 Claims, 4 Drawing Sheets

DUAL BELT CONVEYOR OVEN

FIELD OF THE INVENTION

This invention relates to air impingement food conveying tunnel ovens. More particularly, this invention relates to such ovens which include dual laterally spaced belt conveyors.

BACKGROUND OF THE INVENTION

A major item of cooking equipment used and maintained at pizzerias comprises an air impingement tunnel oven having a belt type continuous loop food conveying cooking grate or rack. A common length of baking time for pizzas cooked within such ovens is five minutes. Accordingly, the conveyor motor speed of such an oven is commonly adjusted so that the oven's continuous loop grate longitudinally travels within five minutes a distance equal to the longitudinal length of the oven. Such longitudinal transit time allows a pizza carried into the oven by the conveyor to emerge therefrom and cease cooking at the end of the desired five minutes cooking time.

Many pizzerias cook and serve additional menu items such as oven toasted sandwiches which require a cooking time which is shorter than that of pizzas. A typical oven cooking time for a toasted sandwich is three minutes. Accordingly, where a pizzeria utilizes a conveyor tunnel oven of the type described above to toast a sandwich, the conveyor's motor speed is commonly upwardly adjusted to provide a three minute longitudinal transit time through the oven. A problem associated with such upward adjustment of the conveyor speed arises when a next successive item to be cooked within the oven comprises a pizza which must be cooked at a slower speed. Where a pizza is to be cooked within such a conveyor tunnel oven immediately following a sandwich, a substantially complete transit of the sandwich through the oven must be awaited prior to resetting of the oven for pizza cooking. The process of adjusting and readjusting a single conveyor's speed in accordance with cooking times needed by various food items results in time loss and wastage of the production capacity of the oven.

In order to solve or ameliorate the oven capacity wastage problem discussed above, air impingement food conveying tunnel ovens are known to incorporate dual or side by side conveyors for the provision of simultaneous varying passage times through the oven. However, in such an assembly, dual drive shafts, dual belt driving motors and dual electronic speed controllers are also typically provided. Provision of such additional mechanisms and equipment undesirably results in excess mechanical complexity and excess equipment expense.

The instant inventive air impingement conveyor tunnel oven solves or ameliorates the problems noted above by providing a dual conveyor air impingement tunnel oven which facilitates simultaneous dual transit speeds through the oven with little or no increase in mechanical complexity, and with little or no increase in the cost of equipment or components installed upon the oven. Such mechanical and economic advantages are achieved through the provision of an annularly coffered or radially stepped drive roller, such roller allowing a single drive motor and electronic speed controller to drive dual or side by side conveyors at varying speeds.

BRIEF SUMMARY OF THE INVENTION

A structural component of the instant inventive air impingement conveyor oven preferably comprises a baking case having an interior space, a food input port, a food output port, and having a longitudinal axis extending from the food input port to the food output port. Preferably, the baking case comprises a rectangular stainless steel box having thermally insulated ceiling, floor side and end walls. Also preferably, the food input and output ports extend through the end walls, such ports preferably being laterally or perpendicularly oblongated with respect to the longitudinal axis. The longitudinal axis preferably comprises a longitudinal reference line which extends substantially centrally through both the food input and food output ports.

A further structural component of the instant invention comprises air heating means connected operatively to the baking case, the air heating means being adapted for heating air within the case's interior space to approximately 450° F. Preferably, the air heating means comprises a single or, where the oven is lengthened longitudinally, dual gas fired single jet burners. Suitably, the air heating means may alternately comprise electric resistance heaters.

A further structural component of the instant invention comprises a plurality of air registers mounted within the baking case's interior space, the air registers preferably being positioned longitudinally along the baking case's longitudinal axis. Preferably, the air registers are adapted for directing a multiplicity of streams of heated air vertically across the longitudinal axis for providing an accelerated air impingement food cooking effect. The air registers are preferably configured to form a plurality of "fingers", each register preferably being laterally oblongated to substantially span the lateral interior width of the oven. Also preferably, dual ranks of such finger registers are provided, a first rank overlying the longitudinal axis and directing streams of heated air downwardly, and a second rank underlying the longitudinal axis and oppositely directing streams of heated air upwardly.

A further component of the instant invention comprises air impelling means mounted within the baking case's interior space for collecting and impelling or driving heated air within the interior space. Preferably, the air impelling means comprises a radial fan driven by an electric motor. Suitably, the air impelling means may comprise a sirocco or "squirrel cage" fan driven by an electric motor. Where the air impelling means comprises the preferred radial fan and electric motor combination, such fan is preferably directly mechanically linked to the motor's output drive. In such preferred embodiment, the fan motor is nestingly received and supported within an aperture within the baking case's rear wall, such motor's housing preferably occlusively closing such aperture.

A further structural component of the instant invention comprises air duct means interconnecting the air registers and the air impelling means. Where preferred configurations of the air registers and air impelling means are provided, as described above, a preferred air duct means comprises an air plenum having an air input aperture which dually functions as an annular shroud surrounding the blades of the fan. The plenum also preferably comprises a plurality of air output ports, each such port communicating with an air input end of one of the air registers. The air duct means element of the instant invention may suitably alternately comprise tubular ducts or paneled subchambers situated within the interior space of the baking case.

Further structural components of the instant invention comprise left and right conveyor belts which are mounted within the interior space of the baking case. The belts are preferably oriented so that they extend along the longitudinal axis and are respectively positioned leftwardly and rightwardly from the longitudinal axis. The left and right conveyor belts necessarily comprise materials capable of maintaining structural strength which is common to fixed oven baking racks and are capable of resisting degradation during use at high cooking temperatures. Preferably, the left and right conveyor belts comprise steel continuous loop baking racks or grids, such racks or grids preferably comprising a multiplicity of laterally extending and closely longitudinally spaced crossbars, such bars preferably being pivotally interlocked or hinged in the manner of a chain linkage at their left and right ends.

A further structural component of the instant invention comprises a first roller or drive roller mounted intersectingly or perpendicularly across the baking case's longitudinal axis, the first roller being frictionally engaged with both the left and the right conveyor belts. The first roller is necessarily annularly coffered or radially stepped at a point which substantially coincides with the baking case's longitudinal axis. In operation of the first roller's annularly or radially coffered step, belts driven by such roller beneficially longitudinally travel at different speeds as a result of the varying circumferences of the roller. The desired frictional engagement between the annularly coffered roller and the twin belts is preferably enhanced by configuring the roller to comprise left and right toothed drive sprockets, such sprockets preferably being laterally and axially elongated so that they are substantially laterally co-extensive with the continuous loop grates which they drive. Such lateral sprocket extension advantageously allows the drive roller to perform triple functions of dual belt support, dual belt driving, and dual belt tracking.

The instant inventive oven preferably further comprises an annularly coffered idler roller, preferably configured similarly with the annularly coffered drive rollers.

In operation of the instant invention, and assuming the provision of a preferred embodiment as described above, and further assuming for the sake of example that it is desirable that a pizzeria maintain five minute and three minute transit times within its dual conveyor oven, the annularly coffered step configuration of the drive roller may effectively present left and right two inch and three and one-third inch diameter drive sprockets which are spaced axially along the roller. Accordingly, where the transit time of a continuous loop grate driven by the three and one-third inch diameter drive sprocket is adjusted to three minutes, the adjacent continuous loop grate will automatically have a five minute transit time. Thus, the single drive axle and speed control of the instant invention may advantageously maintain dual conveyor speeds.

Accordingly, objects of the instant invention include the provision of an air impingement dual belt conveyor oven having components and features as described above, such oven being capable of performing functions as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
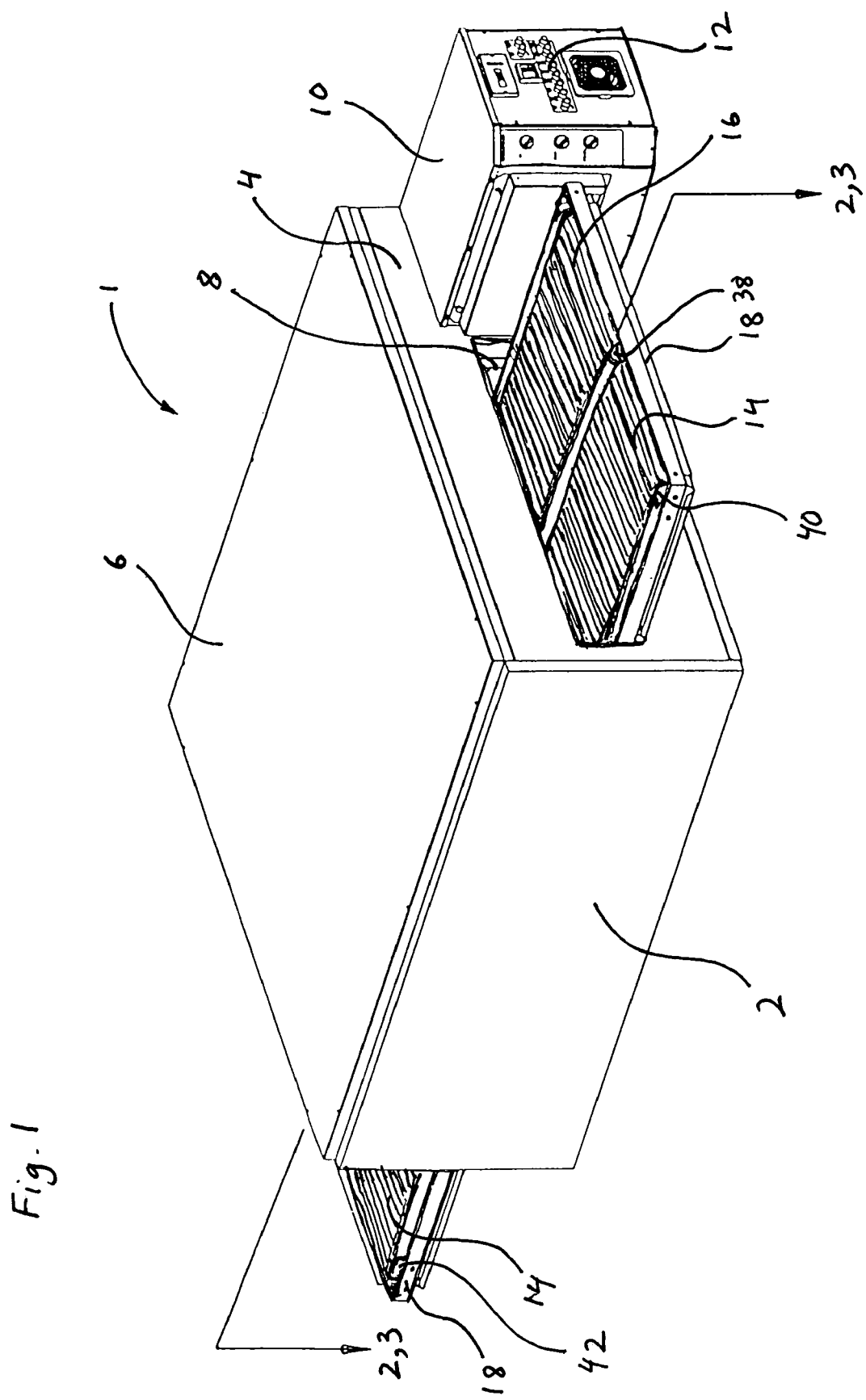
FIG. 1 is an isometric view of a preferred embodiment of the instant inventive oven.
Figure 2:
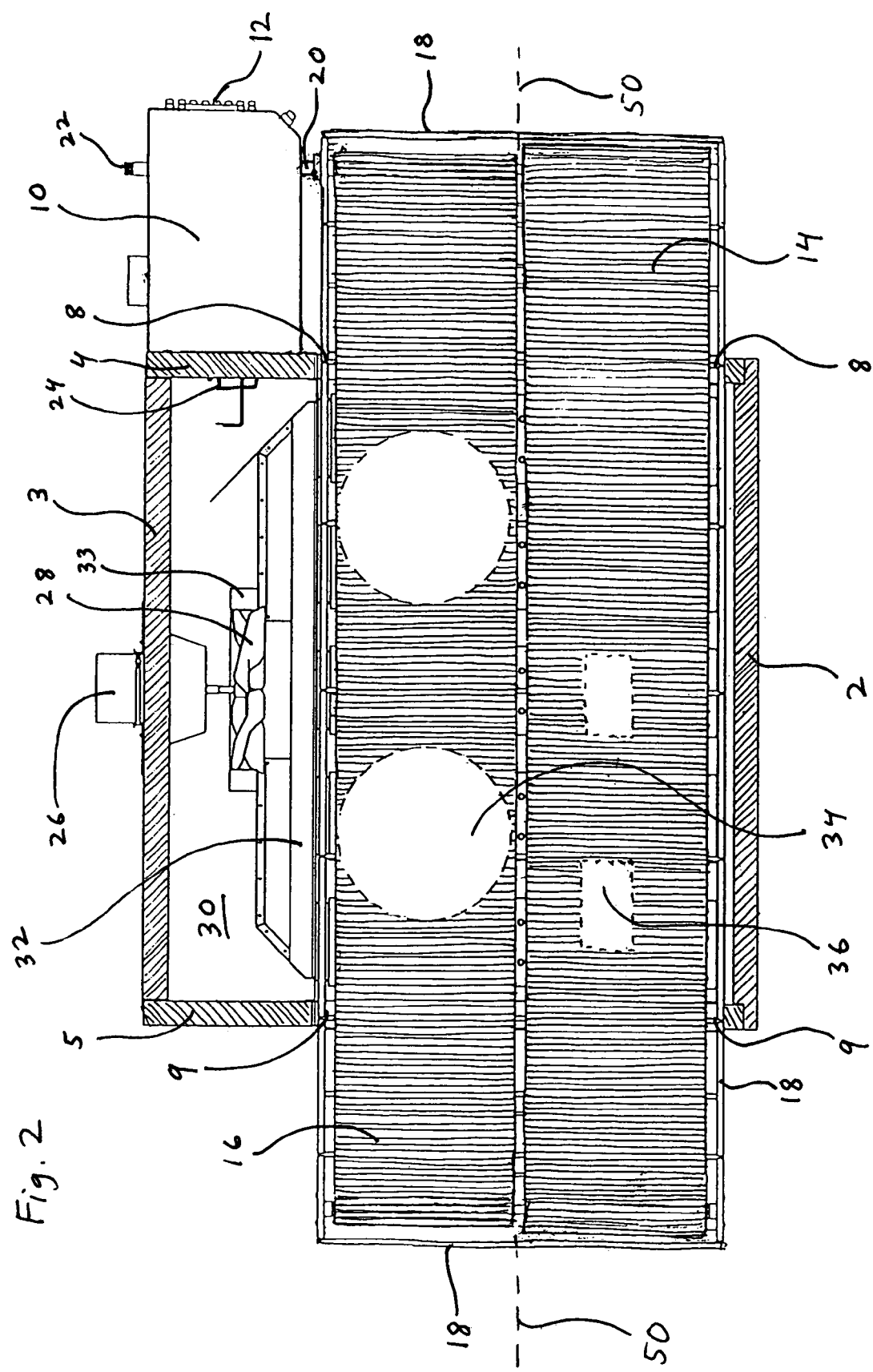
FIG. 2 is a sectional view as indicated in FIG. 1.

Referring now to the drawings, and in particular simultaneously to FIGS. 1 and 2, the instant inventive oven 1 preferably comprises a thermally insulated case including front and rear walls 2 and 3, longitudinally spaced end walls 4 and 5, and a top or roof 6 and a floor. Longitudinal end wall 4 has a laterally oblongated food input port 8, and longitudinal end wall 5 similarly has a laterally oblongated food output port 9.

Referring to FIG. 1, the oven 1 preferably has a wall mounted control box 10, such box presenting operator controls 12. Referring simultaneously to FIG. 2, a gas fired burner 24 is substantially housed within control box, such burner 24 being supplied with combustion fuel via gas line 22. A DC variable speed electric motor (not depicted within view) is also preferably housed within control box 10, such motor having a drive output shaft 20 extending laterally outwardly from control box 10.

Figure 3:
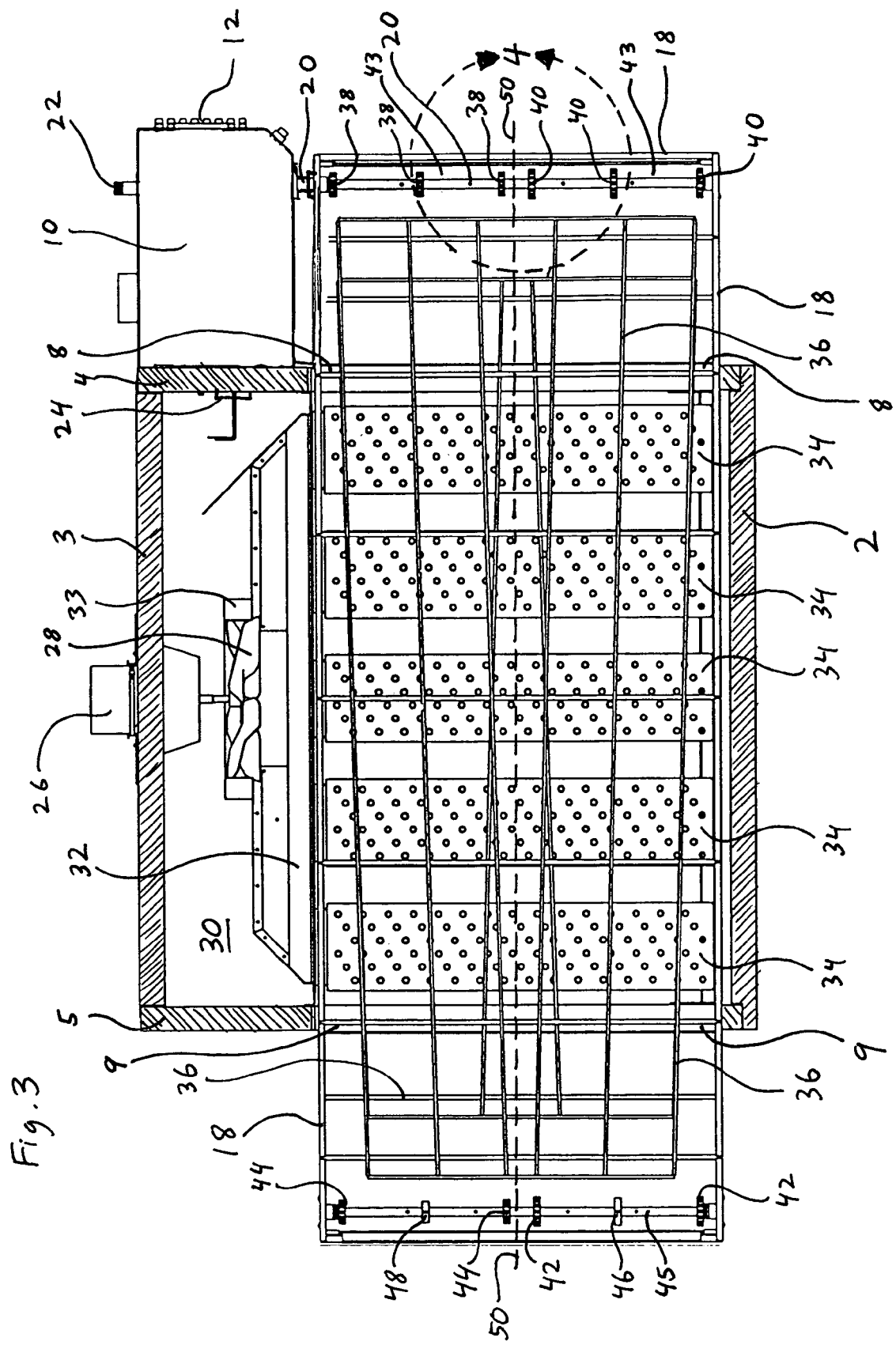
FIG. 3 redepicts FIG. 2, the view of FIG. 3 showing continuous loop grates or oven racks removed.

Referring further to FIG. 3, an air plenum 32 supporting a plurality of air register fingers 34 is preferably mounted within the interior space 32 of the case, such plenum preferably additionally supporting a similarly configured upper rank of air register fingers. The air input end 33 of plenum 30 preferably receives and houses a radial fan 28, such fan 28 preferably being rotatably driven by a second electric motor 26 housed and supported within an aperture within rear wall 3. Heated air within the interior space 30 of the case is drawn forwardly into the air intake 33 of the plenum 32. Thereafter, the heated air is impelled or driven into registers 34. Thereafter, the heated air is driven in the form of a multitude of food impinging air streams, such air streams preferably extending vertically across the oven's longitudinal axis 50.

Referring further to FIG. 3, an air plenum 32 supporting a plurality of air register fingers 34 is preferably mounted within the interior space 30 of the case, such plenum preferably additionally supporting a similarly configured upper rank of air register fingers. The air input end 33 of plenum 30 preferably receives and houses a radial fan 28, such fan 28 preferably being rotatably driven by a second electric motor 26 housed and supported within an aperture within rear wall 3. Heated air within the interior space 30 of the case is drawn forwardly into the air intake 33 of the plenum 32. Thereafter, the heated air is impelled or driven into registers 34. Thereafter, the heated air is driven in the form of a multitude of food impinging air streams, such air streams preferably extending vertically across the oven's longitudinal axis 50.

Figure 4:
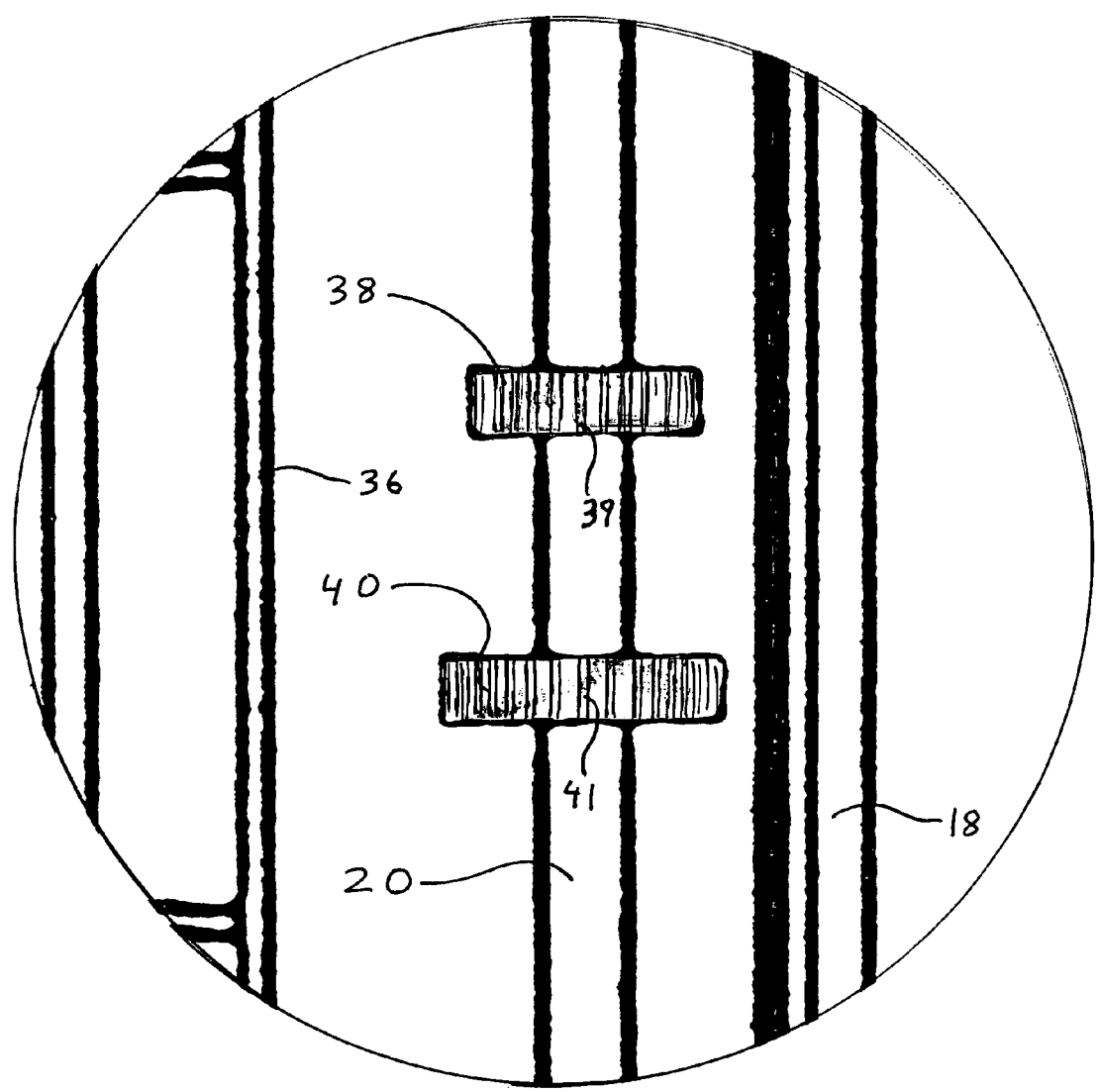
FIG. 4 is a magnified partial view of FIG. 3, as indicated in FIG. 3.

Referring simultaneously to FIGS. 3 and 4, drive shaft 20 preferably supports a roller which is referred to generally by both Reference Numerals 38 and Reference Numerals 40. As can be seen in the drawings, that portion of the roller 38/40 which is designated by Reference Numerals 38 has an effective diameter which is less than that portion of such roller which is designated by Reference Numerals 40. The point of transition between such greater and lesser diameters advantageously constitutes an annular coffer or radially inward step. Preferably, the annular coffer of roller 38/40 is positioned to substantially coincide with the oven's longitudinal axis. Referring further to FIG. 2, the roller 38/40 preferably performs triple functions of supporting, laterally tracking, and driving the left and right continuous loop grates or oven racks 14 and 16. Referring further to FIG. 4, drive roller 38/40 is preferably configured to present sprockets having teeth 39 and 41, such teeth enhancing frictional contact and frictional engagement with the crossbars of the continuous loop grates 14 and 16. The sprockets are preferably laterally and axially elongated to be substantially co-extensive with the lateral dimensions of the continuous loop grates 14 and 16, such lateral elongation advantageously allowing the sprockets to perform the lateral tracking function while supporting and driving said grates. The preferred sprocket configuration of roller 38/40 preferably includes axially intermittent annular voids 43 for decreasing the weight of the roller 38/40 and for furthering the cost economy object of the invention.

Referring to FIG. 3, an idler roller mounted to shaft 45 is referred to generally by Reference Numerals 42, 44, 46, and 48. Such idler 42-48 roller preferably is not driven, the roller functioning only to support and laterally track the output end of the conveyor. Suitably, sections 46 and 48 of the idler roller may include smooth annular surfaces, such sections serving only to, referring further to FIG. 2, support the output ends of continuous loop grades 14 and 16 without lateral tracking engagement. Like drive roller 38/40, idler roller 42-48 preferably is annularly coffered at a point substantially coinciding with the oven's longitudinal line 50.

In operation of the instant invention, referring to FIG. 2, it may be assumed for the sake of example that pizzas 34 require a five minute cooking time while sandwiches 36 require a three minute cooking time. Referring further simultaneously to FIGS. 3 and 4, it may be further assumed that the annularly coffered portion of drive roller 38-40 which is designated by Reference Numerals 38 has an effective diameter of two inches. In the example, it may be further assumed that that portion of roller 38/40 designated by Reference Numerals 40 has an effective diameter of three and one-third inches. Accordingly, upon adjustment of the speed of the conveyor motor, housed within housing 10 to provide a longitudinal transit time of five minutes for continuous loop grate 16, a longitudinal transit time of three minutes is advantageously automatically provided for continuous loop grate 14. Accordingly, constant speed rotation of shaft 20 automatically facilitates desired cooking times both for pizzas 34 and sandwiches 36.

According to the principles and scope of the invention, various other sprocket diameter ratios for facilitating varying dual conveyor speeds may be provided.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An air impingement conveyor oven comprising:
    (a) a baking case having an interior space, a food input port, a food output port, and having a longitudinal axis extending from the food input port to the food output port;
    (b) air heating means connected operatively to the baking case, the air heating means being adapted for heating air within the baking case's interior space;
    (c) a plurality of air registers mounted within the baking case's interior space, the air registers being positioned longitudinally along the baking case's longitudinal axis, the air registers being adapted for directing streams of heated air vertically across the longitudinal axis;
    (d) air impelling means mounted within the baking case's interior space, the air impelling means being adapted for collecting and driving heated air within said space;
    (e) an air plenum interconnecting the air registers and the air impelling means;
    (f) left and right conveyors extending along the baking case's longitudinal axis, the left and right conveyors being respectively positioned from the longitudinal axis;
    (g) a first roller mounted intersectingly across the baking case's longitudinal axis, the first roller being frictionally engaged with the left and right conveyors, the first roller comprising left and right drive sprockets respectively positioned leftwardly and rightwardly from the baking case's longitudinal axis, each of the left and right drive sprockets having a plurality of crossbar engaging teeth, each of the left and right drive sprockets having an effective diameter, the effective diameter of one of the drive sprockets among the left and right drive sprockets being less than that of the other drive sprocket; and
    (h) rotating means connected operatively to the first roller.

2. The air impingement conveyor oven of claim 1 wherein the left and right conveyors respectively comprise left and right continuous loop cooking grates, each of the left and right continuous loop cooking grates comprising a multiplicity of crossbars.

3. The air impingement conveyor oven of claim 2 further comprising an idler roller mounted intersectingly across the baking case's longitudinal axis, the idler roller being frictionally engaged with the left and right continuous loop cooking grates, the idler roller being annularly coffered at a point substantially coinciding with the baking case's longitudinal axis.

4. The oven of claim 3 wherein the idler roller comprise left and right idler sprockets respectively positioned leftwardly and rightwardly from the baking case's longitudinal axis, each of left and right idler sprockets having a plurality of crossbar engaging teeth.

5. The air impingement conveyor oven of claim 4 wherein each of the left and right continuous loop cooking grates has a lateral dimension, and wherein the left and right drive sprockets are axially elongated, the engagements of the left and right drive sprockets with left and right continuous loop cooking grates being substantially co-extensive with said grates' lateral dimensions.

6. The air impingement conveyor oven of claim 5 wherein the left and right idler sprockets are axially elongated, the engagements of the left and right idler sprockets with the left and right continuous loop cooking grates being substantially co-extensive with said grates' lateral dimensions.

* * * * *